Oct. 11, 1932.  O. S. HERSHEY  1,881,571
AUTOMOBILE LOCK
Filed Jan. 12, 1927
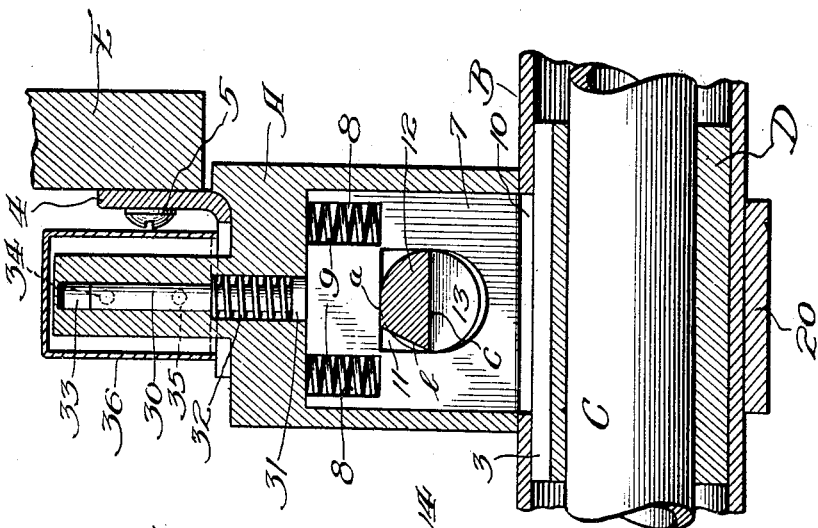
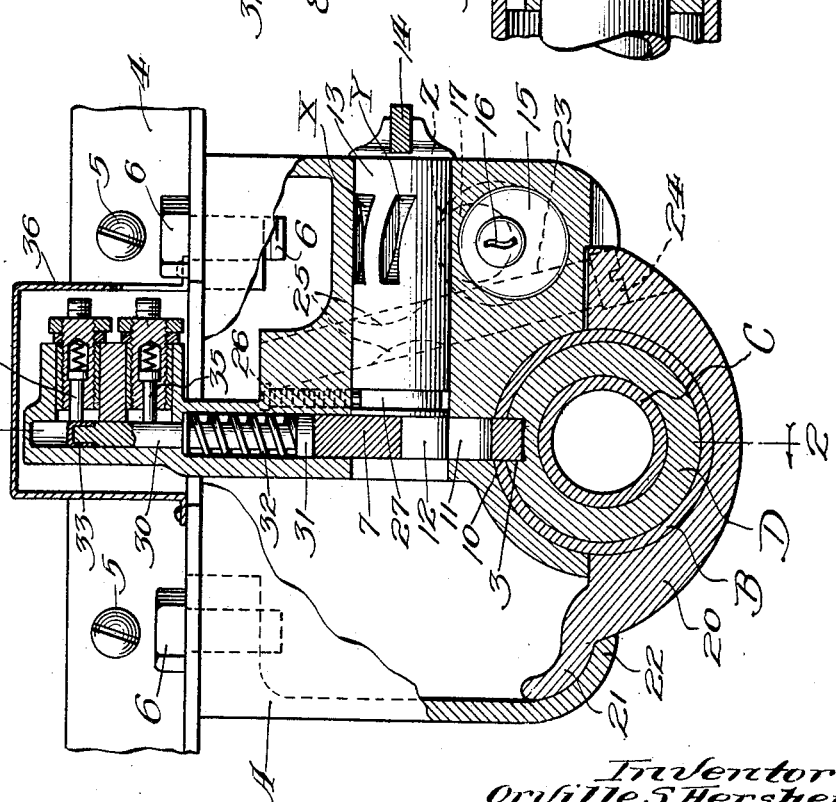
Inventor:
Orville S. Hershey,
by Kenning & Kenning
Attys Patented Oct. 11, 1932

1,881,571

UNITED STATES PATENT OFFICE

ORVILLE S. HERSHEY, OF CHICAGO, ILLINOIS, ASSIGNOR, BY MESNE ASSIGNMENTS, TO OAKES PRODUCTS CORPORATION, OF NORTH CHICAGO, ILLINOIS, A CORPORATION OF MICHIGAN

AUTOMOBILE LOCK

Application filed January 12, 1927. Serial No. 160,613.

This invention relates to certain improvements in automobile locks and more particularly to locks of the type that are associated with the steering column of a motor driven vehicle to secure against rotation the post extending therethrough which, at its upper end, is equipped with the usual steering wheel.

It is a primary object of my invention to provide a lock of simple, practical and efficient construction which may be contained within a housing that surrounds the steering column of an automobile, and, if desired, be secured to a fixed part thereof, such as the dash board. It is a further object to associate with such a lock an ignition switch having an operative connection therewith such that the switch is actuated when the lock is moved. And as a further object of this invention I have devised a mounting for the switch parts, and an assembly thereof in operative relation, which is advantageous in several respects.

Other objects of my invention will hereinafter appear from the description and claims to follow wherein the present improvements are represented as consisting of parts constructed and arranged in accordance with the exemplification shown in the accompanying drawing in the manner following:

Figure 1 which is a transverse section through the steering column shows also, partly in section, and partly in elevation, the present lock in operative association therewith; and Figure 2 is a vertical section therethrough taken on line 2—2 of Fig. 1.

The lock herein shown is contained within a housing A adapted for mounting upon the column B which surrounds in spaced relation an automobile steering post C here represented as a tube. In the region of the lock is a collar D secured fast to the post, there being a longitudinal groove 3 formed in the collar. Since the collar is associated with the post primarily to facilitate construction, and is to all intents and purposes a part thereof, it will be so treated in the description and claims to follow. If the present lock be designed for additional connection to the automobile dash or instrument board E, a bracket angle plate 4 may be used, one face of the plate being attached, as by screws 5, to the instrument board and the other plate face having an adjustable connection with the lock housing as through the medium of attaching bolts 6 which pass through slots in the plate as shown.

The mechanism contained within the housing by which the steering post may be locked against rotation may comprise parts as follows: Within a chamber which extends rearwardly from the column is slidably mounted a locking bolt 7 having at its rear end one or more open slots 8 each accommodating a compression spring 9 which tends to urge the bolt forward through an opening 10 in the column so as to lodge within the collar groove 3. Unless otherwise restrained the locking bolt will, therefore, assume the position indicated in Fig. 1. For controlling the movements of the locking bolt I provide through its body an aperture 11 the rear side of which is flat, and disposed therewithin is an eccentric 12 having two angularly related flat faces $a$ and $b$ and also a third flat face $c$ which is aligned substantially diametrically with the axis of a rock shaft 13 on which the eccentric is formed. This rock shaft is journaled in an opening extending transversely through the housing rearwardly of the column, one end of the shaft being provided with an operating handle 14 which is disposed exteriorly of the lock housing.

Mounted within the housing is a rotatable lock cylinder 15 having an entry slit 16 disposed upon the upper side of the housing for the reception of an operating key. The lock cylinder extends within the housing close to the rock shaft and at its inner end is provided with an eccentric lug 17 adapted when in one position to engage within one of three longitudinal grooves $x$, $y$ and $z$ that are formed in the rock shaft. The circumferential relation of these grooves about corresponds to that of the eccentric faces $a$, $b$ and $c$ so that the springs 9 acting through the bolt 7 will tend to hold the rock shaft in any one of three positions wherein the lug 17 may enter one of the grooves x, y or z. The shaft is thereby locked against further rotation until the lock cylinder is again rotated in the direction necessary to disengage the eccentric lug.

The lock housing may be equipped with a removable collar 20 one end of which is formed with a tongue 21 adapted to hook in behind the rear side of a flange 22 which is extended from the housing. The opposite end of the collar may be made fast thereto as through the medium of a screw bolt 23 having a countersunk head 24 as shown. The bolt is shown as disposed obliquely in relation to other parts contained in the housing so as to be compactly accommodated therewithin, and may also be provided with an elongated annular groove 25 which lies adjacent the periphery of the rock shaft so that the one is in partial intersection with the other. In assembling, the bolt is first set in place following which the rock shaft is moved to its position. The effect of this construction is to lock the bolt against removal thereby rendering impossible the separation of the collar 20 from the housing. The rock shaft may also be held against endwise displacement as by means of a screw or pin 26 the acting end of which is disposed within an annular groove formed annularly of the shaft.

To the rear of the locking bolt 7 the housing is extended to provide a mounting for an electrical switch. As shown, the switch may comprise a stem 30 having a head 31 in abutting relation to the rear end of the locking bolt, preferably at a point between the two slots 8 thereof. The stem is slidably accommodated within a bore which at its forward end is enlarged to receive also a coiled spring 32 which bears against the head 31 so as to urge the stem toward the bolt at all times. The outer end of the stem is fitted with an insulating cap 33. Mounted to bear against different portions of the stem are two pins 34 and 35 which are interposed in one of the wires of an electrical circuit, not shown, the two pins being suitably mounted so as to be insulated from each other and from the surrounding parts. In the position indicated in Fig. 1, the one pin 34 bears against the insulating cap 33 and hence is barred from completing a circuit through to the other pin. If, however, the rock shaft 13 be rotated so as to retract the locking bolt from the steering post, as indicated in Fig. 2, the stem 30 will, through motion transmitted by the bolt, be shifted endwise to present a portion of its body against the pin 34, thereby completing the electrical circuit. The switch so constructed may be protected within an enclosing case 36 removably secured to one end of the lock housing.

In the present construction the assembly of the lock and switch parts is facilitated by reason of the removable collar 20. With this detached, the switch stem and locking bolt may be inserted in place, the former being completely protected by the latter. The disassembly of these parts requires merely a reversal of the operation described. The rock shaft 13 which constitutes the control means for the present lock, may assume any one of three positions depending upon which of its eccentric faces is presented to the rear side of the bolt opening 11. In two of these positions the bolt remains retracted so as not to interfere with the steering, and in one of these two positions, the switch is closed. In the other of these two positions, however, the switch is moved open, as it is also in the third position of the lock control where the bolt 7 is permitted to move into engaging relation with the steering post. This action renders it possible to use both the steering and electrical circuit in the first position, to disable them both in the third position, or, in the second position to disable operation of only the electrical circuit. The only switch element which undergoes movement during these changes in position, derives its movements directly from the locking bolt with which it is loosely connected at all times.

I claim:

1. A coincidental lock in which is combined a locking bolt, a switch having a part movable with the bolt to open or close an electrical circuit, tension means urging the movable switch part against the bolt whereby the one may transmit motion to the other, and means for operating the bolt, substantially as described.

2. A coincidental lock in which is combined a locking bolt, a switch having a part unconnected with the bolt but movable therewith to open or close an electrical circuit, tension means urging the movable switch part against the bolt whereby the latter may transmit motion to the former, and key-controlled means for operating the bolt, substantially as described.

3. A coincidental lock in which is combined a reciprocable locking bolt, a switch having a part aligned and reciprocable with the bolt to open or close an electrical circuit, tension means urging the movable switch part against one end of the bolt whereby the latter may transmit motion to the former, and means for operating the bolt, substantially as described.

4. A coincidental lock in which is combined a reciprocable locking bolt, a coiled spring having its axis parallel with that of the bolt and in engagement therewith to cause the bolt normally to advance, operating means for retracting the bolt against the tension of the spring, a switch in connection with an electrical circuit having a reciprocable part the movements of which open and close the circuit, the said switch part being unconnected with the bolt but adapted to receive engagement from one end thereof, and spring means associated with the said switch part for normally projecting the same toward the bolt whereby the latter may transmit to the former a motion counter to the tension of the spring associated with said switch part, substantially as described.

5. A coincidental lock in which is combined a locking bolt having associated spring means which causes a one-way movement thereof, operating means for the bolt adapted to retract the same against the tension of the said spring means, a switch in connection with an electrical circuit having a movable part which opens or closes the switch, spring means associated with said switch part and adapted to cause normally a one-way movement thereof toward the bolt, the said part being aligned with the bolt so as to receive engagement therefrom and the bolt being adapted to transmit a retractive movement to said switch part counter to the tension of the spring associated therewith, substantially as described.

ORVILLE S. HERSHEY.